(12) United States Patent
Moriya (10) Patent No.: US 8,473,112 B2
(45) Date of Patent: Jun. 25, 2013

(54) BATTERY PACK, ELECTRONIC EQUIPMENT, EQUIPMENT SYSTEM, METHOD FOR CONTROLLING BATTERY PACK COOLING UNIT, AND PROGRAM

(75) Inventor: Jiro Moriya, Chiba (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 13/034,166

(22) Filed: Feb. 24, 2011

(65) Prior Publication Data

US 2011/0218694 A1    Sep. 8, 2011

(30) Foreign Application Priority Data

Mar. 5, 2010    (JP) ................................. 2010-049408

(51) Int. Cl.
*G05D 23/00*    (2006.01)
*H01M 10/50*    (2006.01)

(52) U.S. Cl.
USPC .............................. 700/300; 320/106; 429/62

(58) Field of Classification Search
USPC ................ 700/22, 299, 300; 320/106; 429/62
See application file for complete search history.

(56) References Cited

U.S. PATENT DOCUMENTS

| 7,365,517 | B2 * | 4/2008 | Sakurai et al. | 320/132 |
| 7,439,707 | B2 * | 10/2008 | Shigeeda | 320/106 |
| 7,843,164 | B2 * | 11/2010 | Hara et al. | 320/106 |
| 2011/0093714 | A1 * | 4/2011 | Schaecher et al. | 713/176 |

FOREIGN PATENT DOCUMENTS

JP    2003-142166    5/2003

* cited by examiner

*Primary Examiner* — Ryan Jarrett
(74) *Attorney, Agent, or Firm* — Wolf, Greenfield & Sacks, P.C.

(57) ABSTRACT

A battery pack includes a battery cell, a temperature detection unit configured to detect a temperature of the battery cell, a cooling unit configured to cool down the battery cell, an information reception unit configured to receive first information whether electronic equipment is compatible with the cooling unit from the electronic equipment that is supplied with power from the battery cell, and a cooling function control unit configured to switch ON and OFF of the cooling unit depending on the temperature that is detected in a case where the electronic equipment is compatible with the cooling unit, and keep a drive of the cooling unit OFF in a case where the electronic equipment is incompatible with the cooling unit, based on the first information.

11 Claims, 10 Drawing Sheets

BATTERY PACK, ELECTRONIC EQUIPMENT, EQUIPMENT SYSTEM, METHOD FOR CONTROLLING BATTERY PACK COOLING UNIT, AND PROGRAM

BACKGROUND OF THE INVENTION

1. Field of the Invention

The present invention relates to a battery pack, electronic equipment, an equipment system, a method for controlling a battery pack cooling unit, and a program.

2. Description of the Related Art

Battery packs of the related art such as a lithium-ion battery have had a problem concerning a temperature rise caused by charge/discharge. Japanese Unexamined Patent Application Publication No. 2003-142166, for example, proposed a battery cooling mechanism which sends cool air by using a cooling fan and thereby cools down the battery in order to prevent a battery temperature rise and resulting degradation of a battery output, charging/discharging efficiency, and a battery life.

SUMMARY OF THE INVENTION

In recent battery pack safety standards (Electrical Appliances and Material Safety Act, UL2054, and the like), a restriction with respect to a temperature rise has become severer. In a part of the standards, a usable current value is limited depending on a temperature rise caused by charge and discharge in a battery single trial.

Use of battery-powered equipment such as electronic equipment typified by a portable imaging device to which a battery is connected and a charging system is limited within restrictions of the battery pack safety standards. Therefore, when a temperature and current of the battery pack surpass the restricted temperature and current, a use of the equipment is difficult. Depending on conditions, a function of the equipment is limited or the function is stopped. That is, the use of the equipment is stopped even though a remaining battery level is sufficient.

In order to let a battery pack conform to a specification of the safety standards and supply sufficient current to battery-powered equipment, it is necessary that a battery includes a cooling unit in itself and thereby a temperature rise is suppressed.

However, in a case where a battery including a cooling unit is used, battery-powered equipment also has to be compatible to the battery. It is very difficult as a product lineup to make all pieces of equipment and batteries compatible with the cooling unit, and a compatible system has to be constructed. When the cooling unit is operated, power consumed for the operation is generated. Therefore, remaining battery level calculation of the related art is not usable, so that a new calculation method should be proposed.

It is desirable to provide a battery pack, electronic equipment, an equipment system, a method for controlling a battery pack cooling unit, and a program that are novel and improved and can enhance a current value which can be supplied by cooling down a battery cell.

According to an embodiment of the present invention, there is provided a battery pack including a battery cell, a temperature detection unit configured to detect a temperature of the battery cell, a cooling unit configured to cool down the battery cell, an information reception unit configured to receive first information whether electronic equipment is compatible with the cooling unit from the electronic equipment that is supplied with power from the battery cell, and a cooling function control unit configured to switch ON and OFF of the cooling unit depending on the temperature that is detected in a case where the electronic equipment is compatible with the cooling unit, and keep a drive of the cooling unit OFF in a case where the electronic equipment is incompatible with the cooling unit, based on the first information.

The battery pack may further include an information transmission unit configured to transmit a power consumption value of the cooling unit to the electronic equipment so that the electronic equipment calculates a usable time of the battery cell.

The information transmission unit may set the power consumption value of the cooling unit to be 0 and transmit the power consumption value to the electronic equipment when the drive of the cooling unit is OFF.

The information transmission unit may transmit information showing that the drive of the cooling unit is OFF to the electronic equipment.

According to another embodiment of the present invention, there is provided electronic equipment including a storage unit configured to hold first information whether an equipment body is compatible with a cooling unit of a battery pack, which includes a battery cell and the cooling unit configured to cool down the battery cell, and an information transmission unit configured to transmit the first information to the battery pack that switches ON and OFF of the cooling unit depending on the detected temperature in a case where the equipment body is compatible with the cooling unit and keeps a drive of the cooling unit OFF in a case where the equipment body is incompatible with the cooling unit, based on the first information.

The electronic equipment may further include an information reception unit configured to receive a power consumption value of the cooling unit from the battery pack, and a calculation unit configured to calculate a usable time of the battery cell based on the power consumption value of the cooling unit.

The information reception unit may receive a value of 0 as the power consumption of the cooling unit from the battery pack when a drive of the cooling unit is OFF.

The information reception unit may receive information showing that the drive of the cooling unit is OFF from the battery pack.

According to still another embodiment of the present invention, there is provided an equipment system including a battery pack, which includes a battery cell, a temperature detection unit configured to detect a temperature of the battery cell, a cooling unit configured to cool down the battery cell, an information reception unit configured to receive first information whether electronic equipment is compatible with the cooling unit from the electronic equipment that is supplied with power from the battery cell, and a cooling function control unit configured to switch ON and OFF of the cooling unit depending on the temperature that is detected in a case where the electronic equipment is compatible with the cooling unit, and keep a drive of the cooling unit OFF in a case where the electronic equipment is incompatible with the cooling unit, based on the first information, and the electronic equipment which includes a storage unit configured to hold first information whether an equipment body is compatible with the cooling unit and an information transmission unit configured to transmit the first information to the battery pack.

According to yet another embodiment of the present invention, there is provided a method for controlling a battery pack cooling unit including the steps of detecting a temperature of a battery cell of a battery pack, receiving first information whether electronic equipment, which is supplied with power from the battery cell, is compatible with a cooling unit, which cools down the battery cell, from the electronic equipment, switching ON and OFF of the cooling unit depending on the temperature that is detected in a case where the electronic equipment is compatible with the cooling unit, based on the first information, and keeping a drive of the cooling unit OFF in a case where the electronic equipment is incompatible with the cooling unit, based on the first information.

According to yet another embodiment of the present invention, there is provided a program for allowing a computer to function as a means for detecting a temperature of a battery cell of a battery pack, a means for receiving first information whether electronic equipment, which is supplied with power from the battery cell, is compatible with a cooling unit, which cools down the battery cell, from the electronic equipment, a means for switching ON and OFF of the cooling unit depending on the temperature that is detected in a case where the electronic equipment is compatible with the cooling unit, based on the first information, and a means for keeping a drive of the cooling unit OFF in a case where the electronic equipment is incompatible with the cooling unit, based on the first information.

According to the embodiments of the present invention, a current value which can be supplied can be enhanced by cooling down the battery cell.

DESCRIPTION OF THE PREFERRED EMBODIMENTS

Preferred embodiments according to the present invention will be described in detail below with reference to accompanying drawings. In this specification and the drawings, constituent elements substantially having identical functions and configurations are given a same reference character so as to omit duplicative explanations.

Figure 2A:
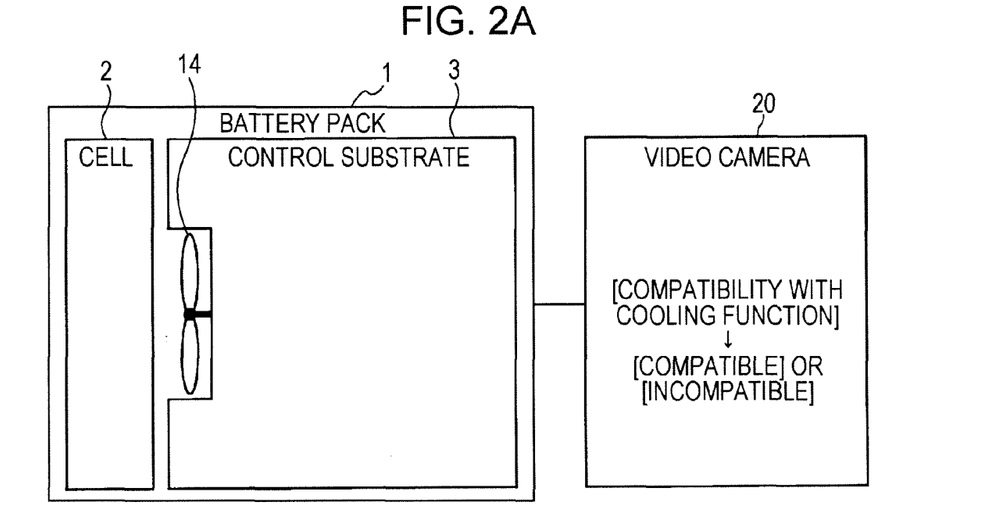
FIGS. 2A and 2B are block diagrams schematically showing the equipment system according to the embodiment of the present invention.
Figure 2B:
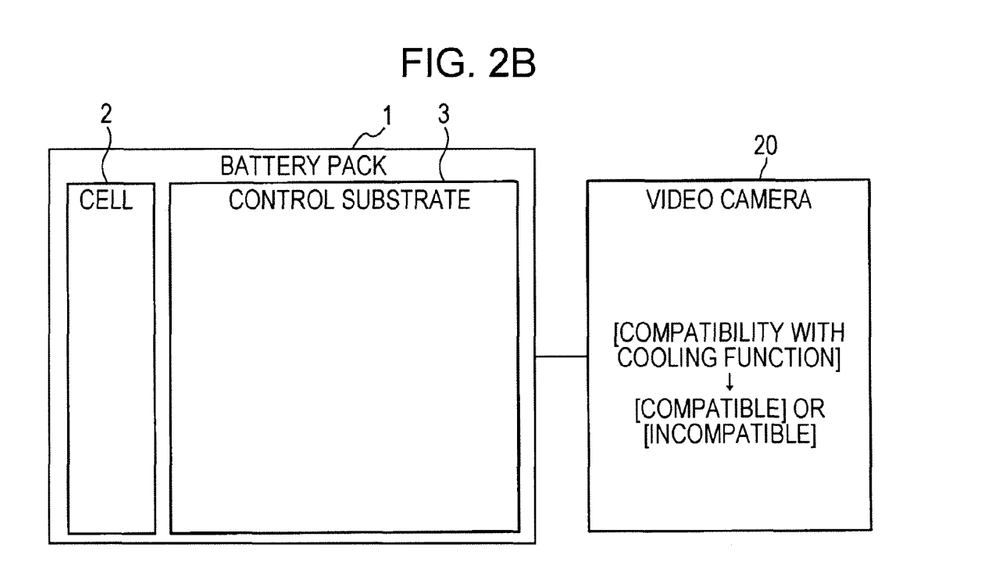

The description is provided in the following order.
1. Embodiment (Equipment System)
2. Another Embodiment (Charging System)
3. Advantageous Effect of Embodiments of Present Invention 1. Embodiment An equipment system composed of a battery pack 1 and a video camera 20 which is connected with the battery pack 1 is described. The equipment system according to an embodiment of the present invention may be an equipment system in which the battery pack 1 provided with a cooling unit 14 is connected with equipment such as the video camera 20 as shown in FIG. 2A, and may be an equipment system in which the battery pack 1 provided with no cooling unit 14 is connected with equipment such as the video camera 20 as shown in FIG. 2B. The video camera 20 may have a function compatible with the cooling unit 14 of the battery pack 1 or may have no function compatible with the cooling unit 14 of the battery pack 1. In the following description, the battery pack 1 provided with the cooling unit 14 is also referred to as the battery pack 1 with "cooling unit 14 [present]" and the battery pack 1 provided with no cooling unit 14 is also referred to as the battery pack 1 with "cooling unit 14 [absent]". Further, the video camera 20 having the function compatible with the cooling unit 14 of the battery pack 1 is also referred to as the video camera 20 "[compatible] with the cooling unit 14", and the video camera 20 having no function compatible with the cooling unit 14 of the battery pack 1 is also referred to as the video camera 20 "[incompatible] with the cooling unit 14".

The battery pack 1 provided with the cooling unit 14 according to the embodiment includes an air-cooling type cooling mechanism 9 such as an air pump and a fan. Accordingly, the battery pack 1 can be cooled down by itself and therefore the battery pack 1 can be prevented from having a high temperature.

Since the cooling unit 14 consumes power, the cooling unit 14 is set to be operated only when the temperature of the battery pack 1 approximately reaches the upper-limit temperature at which the battery pack 1 does not work, during discharge of the battery pack 1 (in a use of equipment such as the video camera 20 which is connected with the battery pack 1).

Information whether battery-powered equipment such as the video camera 20 is [compatible]/[incompatible] with the cooling unit 14 and information whether the cooling unit 14 is [present]/[absent] in the battery pack 1 are shared in communications, whereby the equipment system can be used in any combination of these information. For example, in a case of the battery-powered equipment [incompatible] with the cooling unit 14, the cooling unit 14 of the battery pack 1 is set to be [OFF fixed], whereby the cooling unit 14 is not operated even at a high temperature.

A remaining battery level calculation according to the embodiment is performed by a calculating formula including power consumption of the cooling unit 14, whereby remaining battery level can be accurately calculated also during a cooling operation.

[Battery Pack 1]

Figure 1:
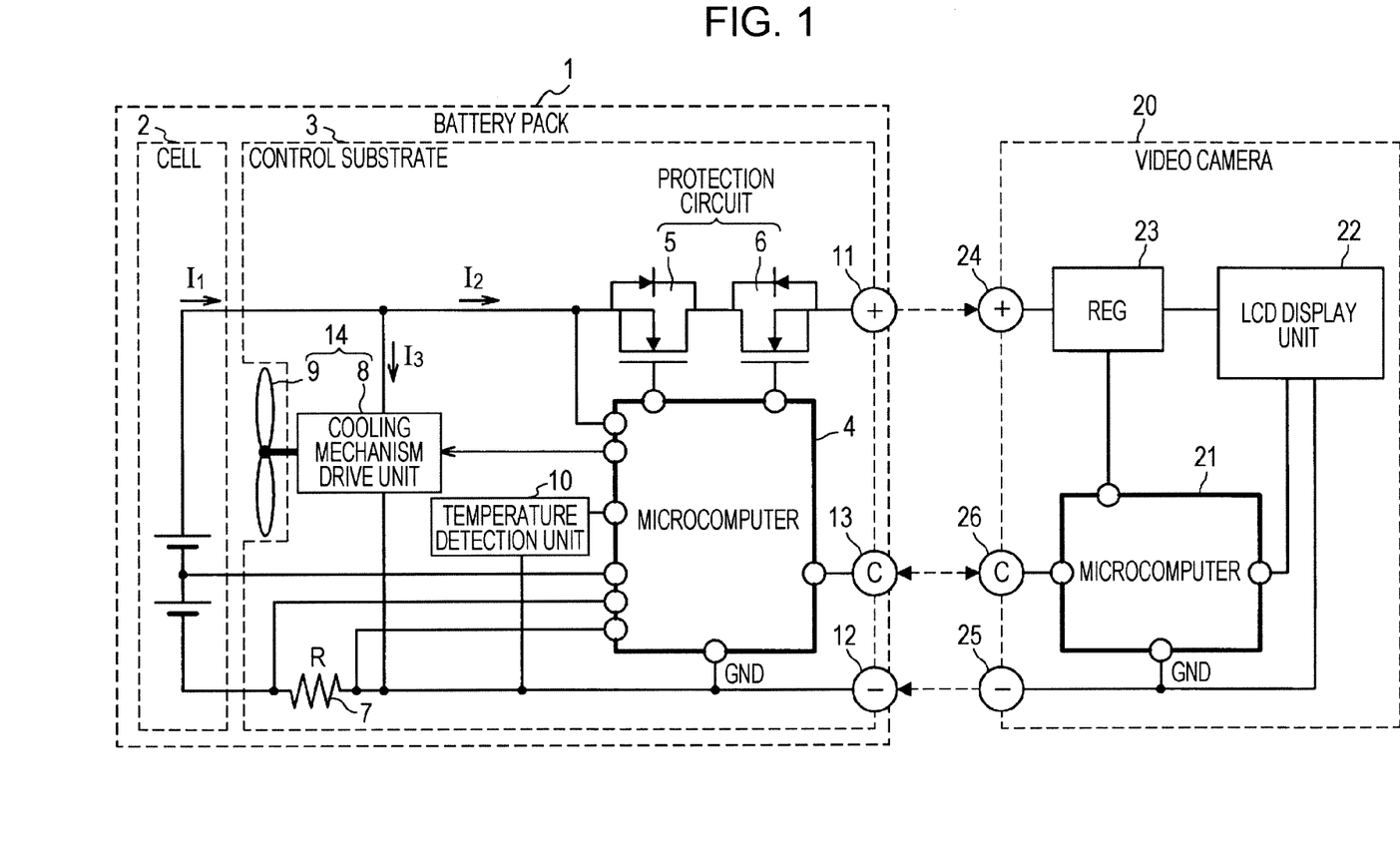
FIG. 1 is a block diagram showing an equipment system according to an embodiment of the present invention.

The configuration of the battery pack 1 according to the embodiment of the present invention is first described. FIG. 1 is a block diagram showing an equipment system according to the embodiment of the present invention. FIG. 1 shows the battery pack 1 and the video camera 20.

The battery pack 1 includes one or a plurality of battery cells 2, and a charge control FET 5, a discharge control FET 6, a microcomputer 4, a current detection resistor 7, a temperature detection unit 10, and the like that are mounted on a control substrate 3. The battery pack 1 further includes the air-cooling type cooling mechanism 9 which is an air pump, a fan, or the like, for example, and is disposed near the cells 2, and a cooling mechanism drive unit 8 which controls the cooling mechanism 9. A combination of the cooling mechanism drive unit 8 and the cooling mechanism 9 is referred to as the cooling unit 14.

The microcomputer 4 of the battery pack 1 includes a driver, an A/D converter, a nonvolatile memory (referred to below as a memory), a communication interface, a CPU, and the like. The microcomputer 4 is connected to a positive cell terminal and detects an output voltage of the battery cell 2. The microcomputer 4 is coupled to the battery cell 2 via the current detection resistor 7 and measures a current value generated by potential difference. Further, the microcomputer 4 is connected to the temperature detection unit 10 such as a thermistor so as to detect a temperature in the inside of the battery pack 1. All pieces of information of a CPU including an integration calculation result at a current value and the like are held in the memory.

In the microcomputer 4, fixed information such as a safety standard upper-limit regulation temperature value, a cooling start temperature value, a cooling stop temperature value, a cooling stop current value, [absent]/[present] information of the cooling unit 14, a power consumption value of the cooling unit 14, a full charge capacitance value, a setting value of each protection device, and the like are preliminarily stored. Further, the microcomputer 4 generates information such as an output voltage value which is a variable value, an input/output current value, a current integration value, charge/discharge cycle information, and a temperature value of the inside of the battery pack 1.

The microcomputer 4 performs information communication with the video camera 20 which is battery-powered equipment, from a control terminal (C) 13 through the communication interface so as to transmit necessary information. When the battery-powered equipment is in an operation state, the microcomputer 4 periodically transmits latest information at an interval of one second, for example. Though the video camera 20 is described as an example of the battery-powered equipment in this embodiment, the battery-powered equipment may be electronic equipment such as a portable imaging device, a charging system, or the like.

In order to correspond to differences of power consumption values caused by cooling methods and abilities, consumption values of the cooling unit 14 which are fixed power values respectively corresponding to the differences are written in the memory of the battery pack 1. During a period in which the cooling unit 14 is not operated, the microcomputer 4 transmits 0 mW as a fixed value at OFF time. During a period in which the cooling unit 14 is operated, the microcomputer 4 transmits a fixed power value.

Figure 3:
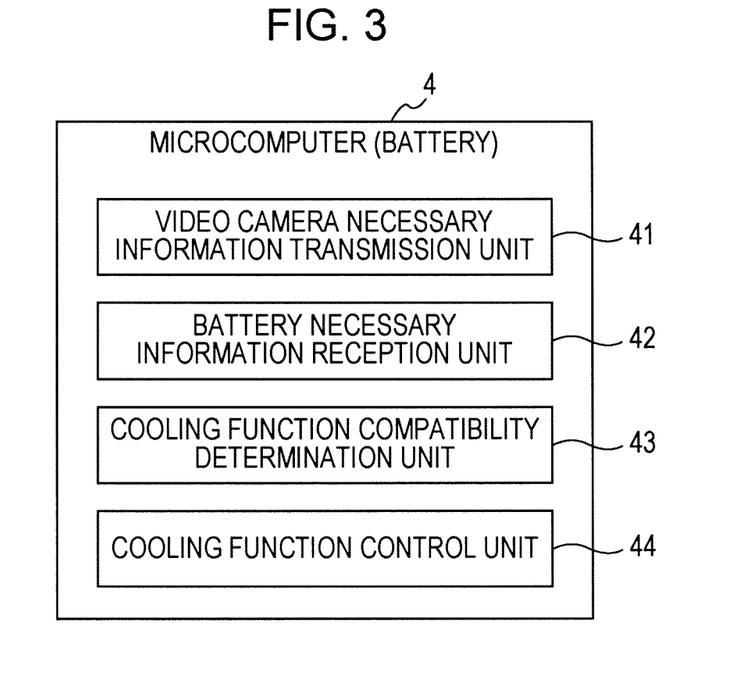
FIG. 3 is a block diagram showing a microcomputer of a battery pack according to the embodiment of the present invention.

The microcomputer 4 includes a video camera necessary information transmission unit 41, a battery necessary information reception unit 42, a cooling function compatibility determination unit 43, a cooling function control unit 44, and the like, as shown in FIG. 3. The video camera necessary information transmission unit 41 is an example of an information transmission unit. The video camera necessary information transmission unit 41 transmits information necessary for the video camera 20, such as a power consumption value of the cooling unit 14, to the video camera 20, enabling the video camera 20 to calculate a usable time of the battery pack 1. The battery necessary information reception unit 42 is an example of an information reception unit. The battery necessary information reception unit 42 receives information (first information) necessary for the battery pack 1, such as whether the video camera 20 is compatible with the cooling unit 14 or not, from the video camera 20. The cooling function compatibility determination unit 43 determines whether the video camera 20 is compatible with the cooling unit 14 based on the battery necessary information. When the video camera 20 is compatible with the cooling unit 14, the cooling function control unit 44 switches ON and OFF of the cooling unit 14 depending on a detected temperature. When the video camera 20 is not compatible with the cooling unit 14, the cooling function control unit 44 keeps a drive of the cooling unit 14 OFF.

The battery pack 1 includes a plus terminal 11 and a minus terminal 12 as power input/output terminals.

[Video Camera 20]

An example of the configuration of a camera integrated video recorder 20 (referred to below as the video camera 20) is shown as an example of electronic equipment typified by a portable imaging device on which the battery pack 1 is mounted.

The video camera 20 includes a microcomputer 21, a display device (referred to below as an LCD display unit) 22, and a power source block (referred to below as an REG) 23.

The microcomputer 21 includes at least a nonvolatile memory (referred to below as a memory) which stores each setting and data, a communication interface, a CPU which performs a remaining level calculation depending on each information, and a display control circuit which generates a display signal.

Figure 4:
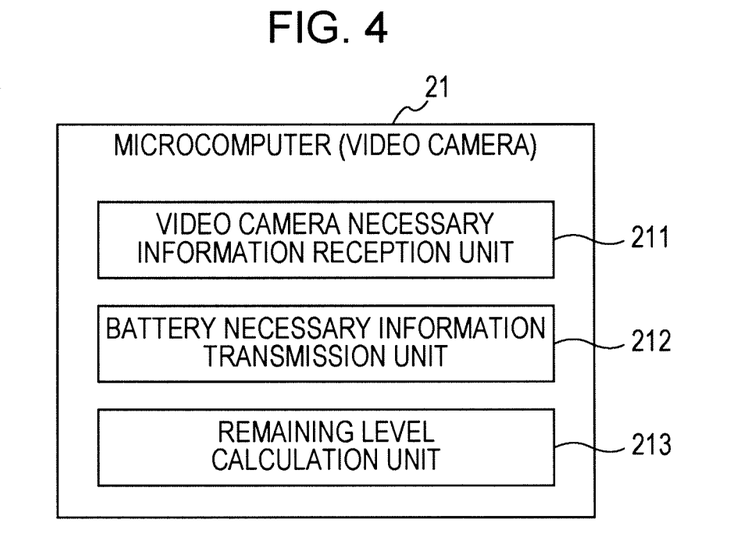
FIG. 4 is a block diagram showing a microcomputer of a video camera according to the embodiment of the present invention.

The microcomputer 21 includes a video camera necessary information reception unit 211, a battery necessary information transmission unit 212, a remaining level calculation unit 213, and the like, as shown in FIG. 4. The video camera necessary information reception unit 211 is an example of an information reception unit. The video camera necessary information reception unit 211 receives information necessary for the video camera 20, such as a power consumption value of the cooling unit 14, from the battery pack 1. The battery necessary information transmission unit 212 transmits information (first information) necessary for the battery pack 1, such as whether a body of the video camera 20 is compatible with the cooling unit 14 of the battery pack 1. The remaining level calculation unit 213 is an example of a calculation unit, and calculates a usable time of the battery pack 1 based on the power consumption value of the cooling unit 14.

The LCD display unit 22 is supplied with a display signal corresponding to a calculation result of the microcomputer 21 and displays a battery remaining level and the like based on the display signal. The REG 23 is supplied with power from the battery pack 1 and outputs necessary voltage to each block. Though the video camera 20 includes various elements such as an element for shooting and elements for recording/reproducing a shot video signal, descriptions of the elements are omitted in the description of FIG. 1.

The plus terminal 11 of the battery pack 1 is connected with a plus terminal 24 of the video camera 20, and the minus terminal 12 of the battery pack 1 is connected with a minus terminal 25 of the video camera 20. Power source is supplied from the battery pack 1 to the video camera 20 via the plus terminal 24 and the minus terminal 25 of the video camera 20. Information communication between the microcomputer 4 of the battery pack 1 and the microcomputer 21 of the video camera 20 is performed via the control terminal (C) 13 of the battery pack 1 and a control terminal (C) 26 of the video camera 20.

In the microcomputer 21, a safety standard discharge upper-limit regulation temperature (operation stop) of the battery, a recoverable temperature at the operation stop time, a high temperature attention attraction temperature when the cooling unit 14 of the battery pack 1 is [absent], and the like as well as a fixed power value for each using mode and each setting value information are preliminarily stored. The microcomputer 21 transmits information that video camera 20 is [compatible]/[incompatible] with the cooling unit 14 as well as a set-end voltage value, a set power value, and the like to the battery pack 1 from the control terminal (C) 26 through the communication interface.

In a case where the cooling unit 14 of the battery pack 1 employs cool-air type cooling and the battery pack 1 is installed inside the video camera 20, a ventilation path for cooling air-supplying/exhausting for battery pack 1 may have to be provided at an exterior of the video camera 20. Therefore, when the video camera 20 does not include a ventilation path and is incompatible with the cooling unit 14 of the battery pack 1, the video camera 20 transmits information that the video camera 20 is [incompatible] with the cooling unit 14.

Figure 11:
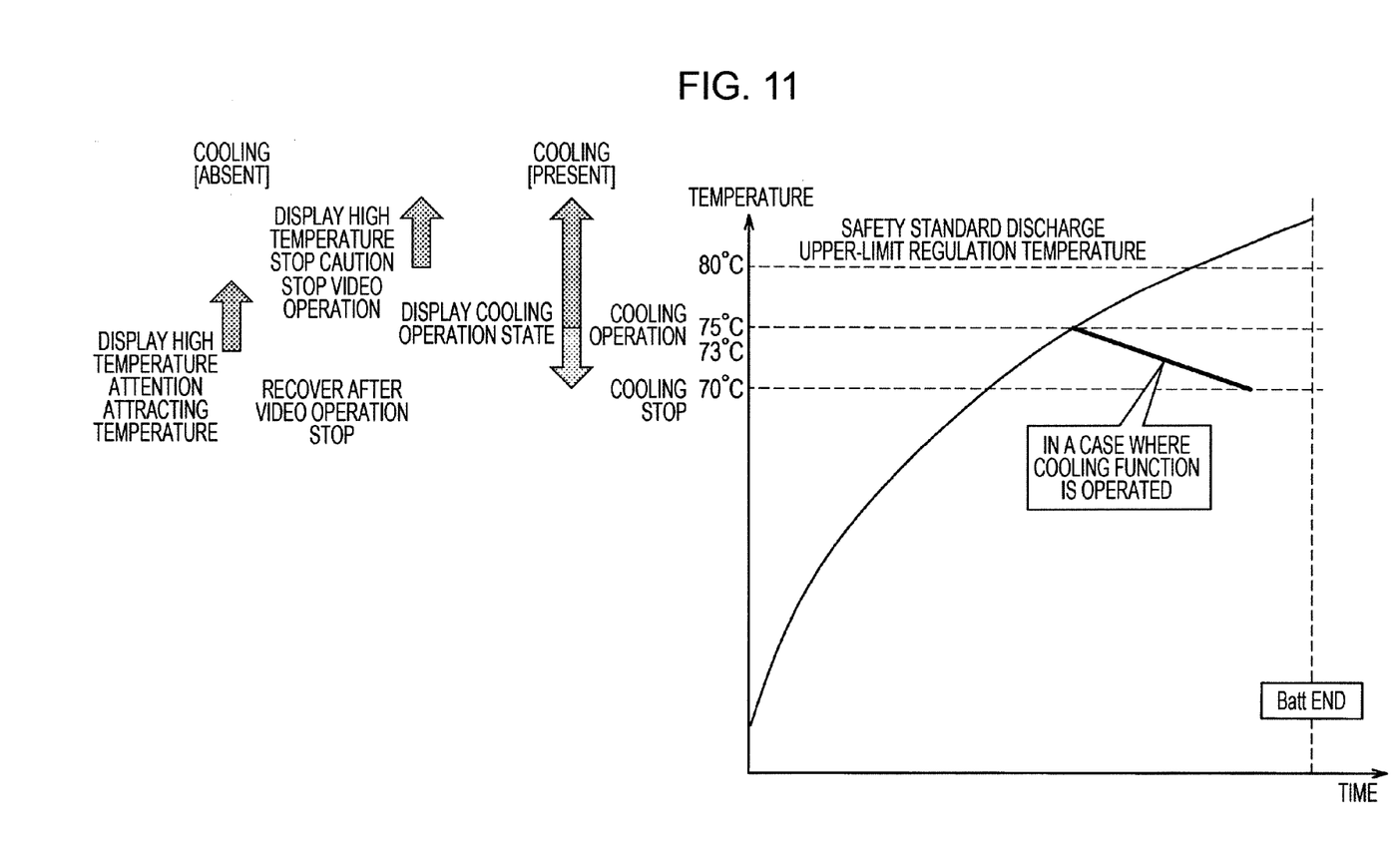
FIG. 11 is a graph showing a relationship between a temperature of the battery pack and time.

Information respectively held in the battery pack 1 and the video camera 20 are next described. FIG. 11 illustrates a temperature image of the battery pack 1. FIG. 11 is a graph showing a relationship between a temperature of the battery pack 1 and time.

[Information at Battery Side]

Information held in the battery pack 1 is described below.

Security standard upper-limit regulation temperature value: Depends on an RTI temperature (80° C.) of a cabinet especially of UL2054 application in single body discharge.

Cooling start temperature value: A temperature at which cooling is started and is set with a margin with respect to the safety standard upper-limit regulation temperature value (for example, 75° C.)

Cooling stop temperature value: A temperature at which cooling is stopped in a case where the cooling is started and the temperature is decreased (for example, 70° C.)

Cooling stop current value: Cooling is stopped because the temperature does not rise in a case where current is sufficiently lowered after the cooling is started (for example, 100 mA).

Power consumption value of the cooling unit 14: The power consumption value of the cooling unit 14 is stored as a fixed value (B). When the cooling unit 14 is in the OFF state, 0 mW is a fixed value (A). The fixed value (B) is transmitted at the [ON] state of the cooling unit 14, and the fixed value (A) is transmitted at the [OFF] state of the cooling unit 14. Accordingly, the power consumption value of the cooling unit 14 also serves as an operation state flag.

Full charge capacitance value: Capacitance (integration value) at full charge, used for a remaining level calculation

[Present]/[absent] information of the cooling unit 14: On a lineup, identification information for a case without the cooling unit 14

[Information at Video Camera Side]

Information held in the video camera 20 is next described.

Safety standard discharge upper-limit regulation temperature of the battery pack 1 (operation stop): An operation has to be stopped depending on a surface temperature (80° C.) of the cell 2 at an equipment (the video camera 20) side due to the regulation of Electrical Appliance and Material Safety Law.

Recoverable temperature in operation stop time: A temperature which is set such that operation may be recovered at this temperature after the operation is stopped (for example, 70° C.).

High temperature attention attraction temperature and the like when the cooling unit 14 of battery pack 1 is [absent]: Caution a user before an operation is stopped due to no cooling (for example, 73° C.)

[Compatible]/[incompatible] information with respect to the cooling unit 14: When the battery pack 1 is externally attached or the like and therefore equipment (the video camera 20) does not have to be compatible with the cooling unit 14, or when the battery pack 1 is installed inside the equipment and an air supply/exhaust ventilation path is provided, [compatible] information is transmitted. When there is an adverse effect in a cooling operation or when there is no effect even in the cooling operation, [incompatible] information is transmitted.

[Operation of Equipment System]

An operation of the equipment system composed of the video camera 20 and the battery pack 1 is next described.

Figure 5:
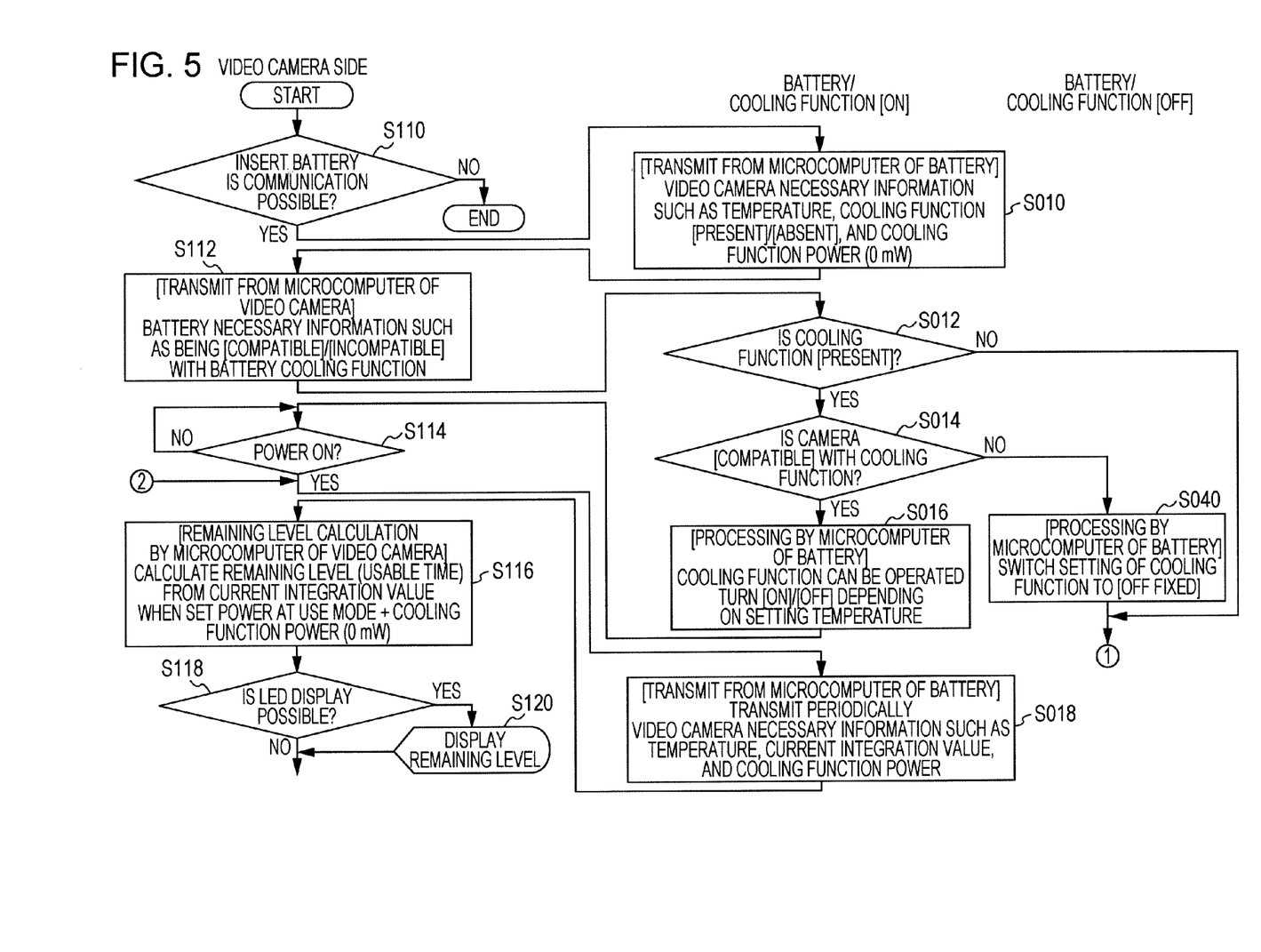
FIG. 5 is a flowchart showing an operation of the equipment system according to the embodiment of the present invention.

When the battery pack 1 is inserted into the video camera 20, whether the video camera 20 can communicate with the battery pack 1 is checked (step S110). When it is difficult for the video camera 20 and the battery pack 1 to mutually communicate, the embodiment of the present invention is not applied. On the other hand, in a case where the video camera 20 can communicate with the battery pack 1, when the battery pack 1 is installed in the video camera 20, video camera necessary information is transmitted from the microcomputer 4 of the battery pack 1 to the microcomputer 21 of the video camera 20 (step S010). The video camera necessary information is necessary for the video camera 20 and includes a set end voltage value, a cell voltage value, a discharge current value, a temperature value of the inside of the battery pack 1, a full charge capacitance value, a current integration value, [present]/[absent] information of the cooling unit 14, a power consumption value, which is a fixed value, of the cooling unit 14, and the like.

During a period in which the cooling unit 14 of the battery pack 1 is [OFF], a power consumption value of the cooling unit 14 is set to be 0 mW and transmitted to the video camera 20. This transmission serves as determination information which shows the cooling unit 14 is [OFF]. These are performed when the battery pack 1 is installed even in a state that the power source of the video camera 20 is not powered [ON].

The video camera 20 transmits battery pack necessary information from the microcomputer 21 of the video camera 20 to the microcomputer 4 of the battery pack 1 (step S112). The battery pack necessary information includes a set end voltage value, a set power value, [compatible]/[incompatible] information with respect to the cooling unit 14, and the like. These are performed when the battery pack 1 is installed even in a state that the video camera 20 is not powered [ON].

In a case where the cooling unit 14 of the battery pack 1 is [present] (step S012) but the video camera 20 is [incompatible] with the cooling unit 14 (step S014), the battery pack 1 switches the setting of the cooling unit 14 to [OFF fixed] (step S040). Accordingly, the cooling unit 14 of the battery pack 1 is not used. The [OFF fixed] setting of the cooling unit 14 is cancelled when the battery pack 1 is uninstalled from the video camera 20 or when the information communication is ceased.

In a case where the cooling unit 14 of the battery pack 1 is [present] (step S012) and the video camera 20 is [compatible] with the cooling unit 14 (step S014), the cooling unit 14 can be operated and the microcomputer 4 of the battery pack 1 turns [ON]/[OFF] the cooling unit 14 depending on a set temperature (step S016).

After the video camera 20 is powered ON (step S114), variable value information is periodically transmitted from the microcomputer 4 of the battery pack 1 (step S018).

The microcomputer 21 of the video camera 20 calculates remaining time (referred to below as a remaining battery level) during which the video camera 20 can be used in a current use mode (step S116). The battery remaining level calculation is performed by using a power value (fixed value) of the video camera 20 at a current operation mode as well as charge/discharge cycle information, a set end voltage value, a temperature value of the inside of the battery pack 1, a full charge capacitance value, a current integration value, and the like.

The embodiment of the present invention adopts a total power calculating formula of the related art in which the power consumption value of the cooling unit 14, which is information sent from the battery pack 1, is added to the power value (fixed value) of the video camera 20 at a current operation mode. This enables a calculation of a more accurate remaining battery level including a power consumption value of a case where the temperature of the battery pack 1 rises and the cooling unit 14 is operated. In a case where the cooling unit 14 is not operated or a case where the cooling unit 14 is [absent], the calculating formula can be shared to be used since the power consumption value of the cooling unit 14 is 0 mW (step S116).

When the LCD display unit 22 of the video camera 20 is capable of displaying (step S118), the remaining battery level information obtained by the above calculation circuit is displayed on the LCD display unit 22 (step S120).

Figure 6:
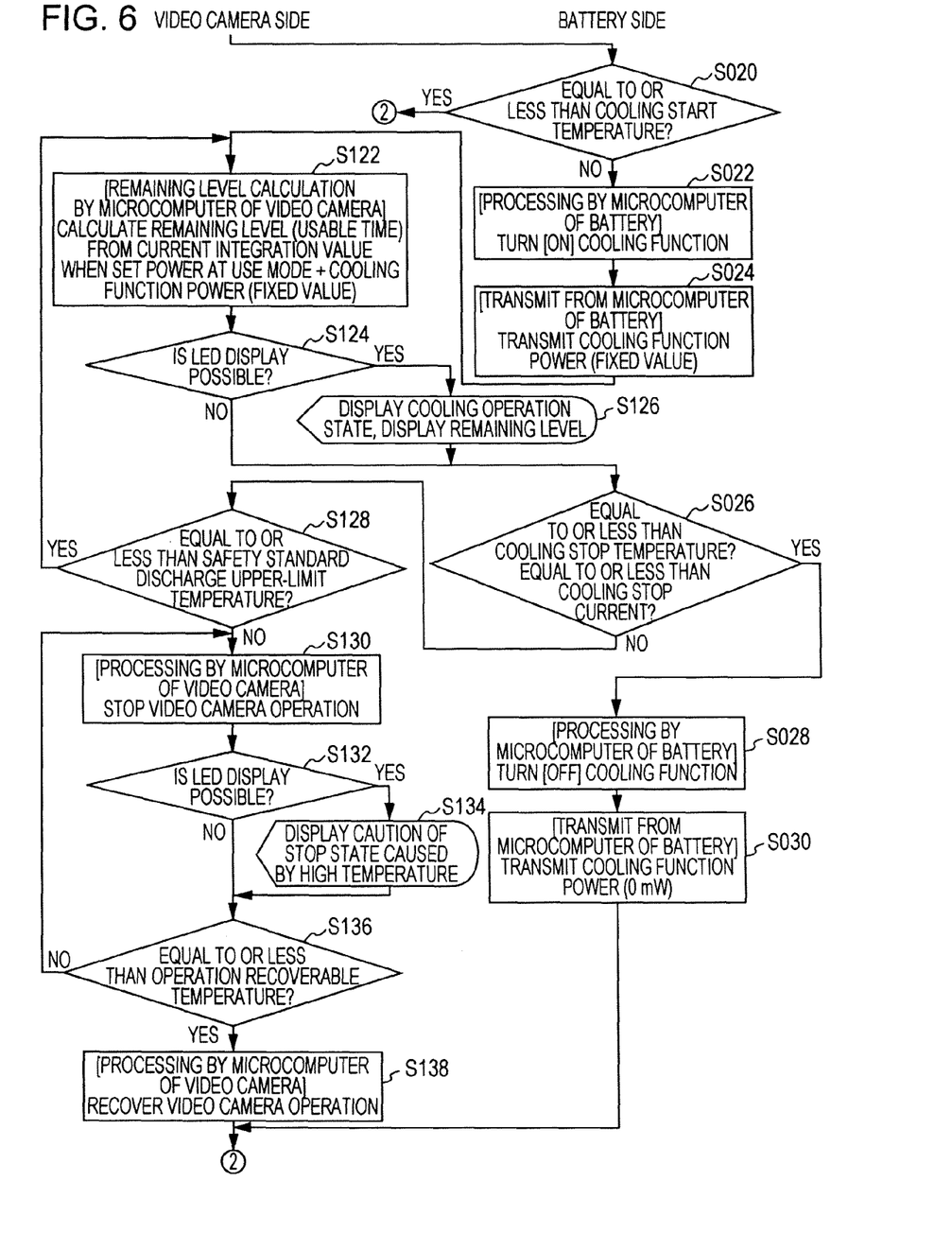
FIG. 6 is a flowchart showing the operation of the equipment system according to the embodiment of the present invention.

In a case where the cooling unit 14 of the battery pack 1 is [present] and the video camera 20 is [compatible] with the cooling unit 14 (steps S012 and S014), the battery pack 1 determines whether the temperature of the temperature detection unit 10 of the battery pack 1 is equal to or less than a cooling start temperature which is stored in the microcomputer 4 (step S020). When the temperature of the temperature detection unit 10 of the battery pack 1 surpasses the cooling start temperature, the battery pack 1 operates the cooling unit 14 (step S022).

When the cooling unit 14 is turned to be in the operation state, the microcomputer 4 of the battery pack 1 changes the power consumption value of the cooling unit 14 from 0 mW to the power consumption value of the cooling unit 14 which is a fixed value and is stored in the microcomputer 4 of the battery pack 1 so as to transmit the fixed value to the microcomputer 21 of the video camera 20 (step S024). The power consumption value, which is a fixed value and transmitted to the video camera 20, of the cooling unit 14 serves also as information which shows a start of the cooling. The video camera 20 detects the cooling of the battery pack 1 by receiving the fixed value. The information which shows the start of the cooling may be a flag which is separate from the power consumption value, which is the fixed value, of the cooling unit 14.

When the microcomputer 21 of the video camera 20 receives the information of the power consumption value of the cooling unit 14, the microcomputer 21 calculates a remaining battery level including the power consumption value of the cooling unit 14 (step S122). When the LCD display unit 22 of the video camera 20 is capable of displaying (step S124), the calculated remaining battery level and attention attraction for notifying the operation state of the cooling unit 14 are displayed on the LCD display unit 22 of the video camera 20 (step S126). Accordingly, a user can obtain choices of whether the user continuously uses the video camera 20 even though excess power is consumed and whether the user temporarily stops the use of the video camera 20 so as to decrease the temperature of the battery pack 1.

During the operation of the cooling unit 14, whether the temperature of the inside of the battery pack 1 is equal to or less than a cooling stop temperature value which is set with a hysteresis and is stored in the microcomputer 4 of the battery pack 1 or whether a discharge current value is equal to or less than a cooling stop current value which is set to have a value low enough not to influence a temperature rise (step S026). When the temperature of the inside of the battery pack 1 becomes equal to or less than the cooling stop temperature value or the discharge current value becomes equal to or less than the cooling stop current value, the microcomputer 4 of the battery pack 1 stops the cooling unit 14 (step S028). At that time, the power consumption value of the cooling unit 14 is changed to 0 mW so as to be transmitted from the microcomputer 4 of the battery pack 1 to the microcomputer 21 of the video camera 20 (step S030).

When the microcomputer 21 of the video camera 20 receives information of the power consumption value of the cooling unit 14, the microcomputer 21 calculates a remaining battery level by using the power consumption value of 0 mW of the cooling unit 14 (step S116). Then, the microcomputer 21 deletes the display of the attention attraction for notifying the operation state of the cooling unit 14 and displays a calculated remaining battery level value on the LCD display unit 22 of the video camera 20 (step S120).

When the temperature further rises even during the operation of the cooling unit 14 due to an abnormal factor and the like and the temperature reaches the safety standard discharge upper-limit regulation temperature (step S128), the video camera 20 forcibly stops the operation of the video camera 20 (step S130). Whether the operation of the video camera 20 is stopped is determined by determining whether the temperature of the inside of the battery pack 1 is equal to or more than the battery safety standard discharge upper-limit regulation temperature which is stored in the microcomputer 21 of the video camera 20, based on information which is periodically transmitted from the microcomputer 4 of the battery pack 1.

In a case where the operation of the video camera 20 is stopped, when the LCD display unit 22 of the video camera 20 is capable of displaying (step S132), the microcomputer 21 and the LCD display unit 22 of the video camera 20 are exclusively set to be in the operation state so as to display a caution of an operation stop state caused by a high temperature of the battery (step S134).

Next, whether the temperature of the inside of the battery pack 1 reaches an operation recoverable temperature value is determined based on information which is periodically transmitted from the microcomputer 4 of the battery pack 1 (step S136). The operation recoverable temperature value is set with a hysteresis and is stored in the microcomputer 21 of the video camera 20.

When the temperature of the inside of the battery pack 1 becomes equal to or less than the operation recoverable temperature value, the operation of the video camera 20 is recovered (step S138).

Figure 7:
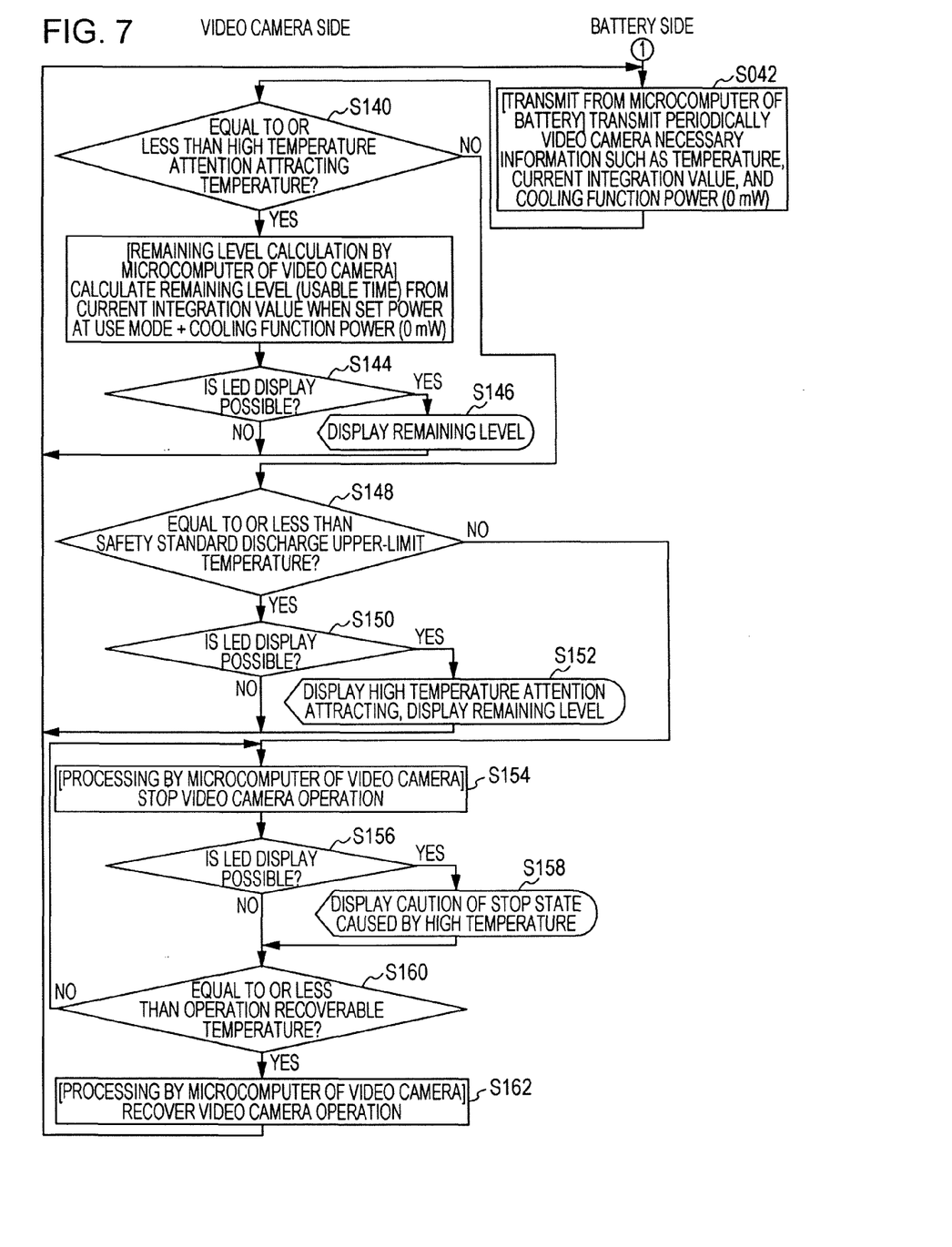
FIG. 7 is a flowchart showing the operation of the equipment system according to the embodiment of the present invention.

In a case where the cooling unit 14 is [absent] or a case where the video camera 20 is [incompatible] with the cooling unit 14, video camera necessary information is periodically transmitted from the microcomputer 4 of the battery pack 1 to the microcomputer 21 of the video camera 20 (step S042). At this time, the power consumption value of the cooling unit 14 is set to be 0 mW and transmitted from the microcomputer 4 of the battery pack 1 to the microcomputer 21 of the video camera 20.

In a case where the temperature of the inside of the battery pack 1 rises at the operation time (shooting time, reproducing time, and the like) of the video camera 20, when the video camera 20 determines that the temperature of the inside of the battery pack 1 is equal to or more than the battery high temperature attention attraction temperature value, the video camera 20 displays the battery high temperature attention attraction (step S152). The battery high temperature attention attraction temperature value is a value which is stored in the microcomputer 21 of the video camera 20 and used for seeking attention when the cooling unit 14 is [absent]. The video camera 20 determines whether the temperature of the inside of the battery pack 1 is equal to or more than the battery high temperature attention attraction temperature value based on information which is periodically transmitted from the microcomputer 4 of the battery pack 1.

When the video camera 20 determines that the temperature of the inside of the battery pack 1 is equal to or less than the safety standard discharge upper-limit temperature value and the LCD display unit 22 of the video camera 20 is capable of displaying (step S150), the LCD display unit 22 displays high temperature attention attraction and a remaining battery level (step S152).

The video camera 20 determines whether the temperature of the inside of the battery pack 1 is equal to or more than the battery safety standard discharge upper-limit regulation temperature which is stored in the microcomputer 21 of the video camera 20 depending on information which is periodically transmitted from the microcomputer 4 of the battery pack 1 (step S148). When the temperature of the inside of the battery pack 1 exceeds the battery high temperature attention attraction temperature value and reaches the safety standard discharge upper-limit regulation temperature value due to a further use of the video camera 20, the operation of the video camera 20 is stopped (step S154).

When the operation of the video camera 20 is stopped and when the LCD display unit 22 of the video camera 20 is capable of displaying (step S156), the microcomputer 21 and the LCD display unit 22 of the video camera 20 are exclusively set to be in the operation state so as to display a caution of the operation stop state due to the high temperature of the battery (step S158).

Then, when it is determined that the temperature of the inside of the battery pack 1 becomes equal to or less than an operation recoverable temperature value which is set with a hysteresis and is stored in the microcomputer 21 of the video camera 20, based on information which is periodically transmitted from the microcomputer 4 of the battery pack 1, the operation of the video camera 20 is recovered (step S162).

An example of a calculating formula of a remaining battery level of the video camera 20 is shown below. In a remaining battery level calculation of the embodiment, a power consumption value (a fixed value or 0 mW) of the cooling unit 14 is included.

$$\text{Remaining battery time} = (B\text{now}/B\text{max}) \times (Mw/(W\text{set} + W\text{battcool}))$$

Bmax: Full charge state current integration value of the battery
Bnow: Present time current integration value of the battery
Mw: Shooting time at a reference power of the video camera
Wset: Power value at a use mode of the video camera
Wbattcool: Power consumption value of the cooling unit 14 of the battery The case of the cool-air type cooling performed by an air pump, a fan, or the like is described as an example in FIG. 1 and the above description. However, the system control of the embodiment is applicable also when a cooling mechanism of water-cooling type cooling in which liquid body is circulated or a cooling mechanism of electronic cooling in which a Peltier element or the like is used is adopted as the cooling mechanism 9.

2. Another Embodiment

A charging system composed of the battery pack 1 and a recharger 30 which is connected with the battery pack 1 is described. The configuration of the battery pack 1 is same as that of the battery pack 1 described in the embodiment described first.

Figure 8:
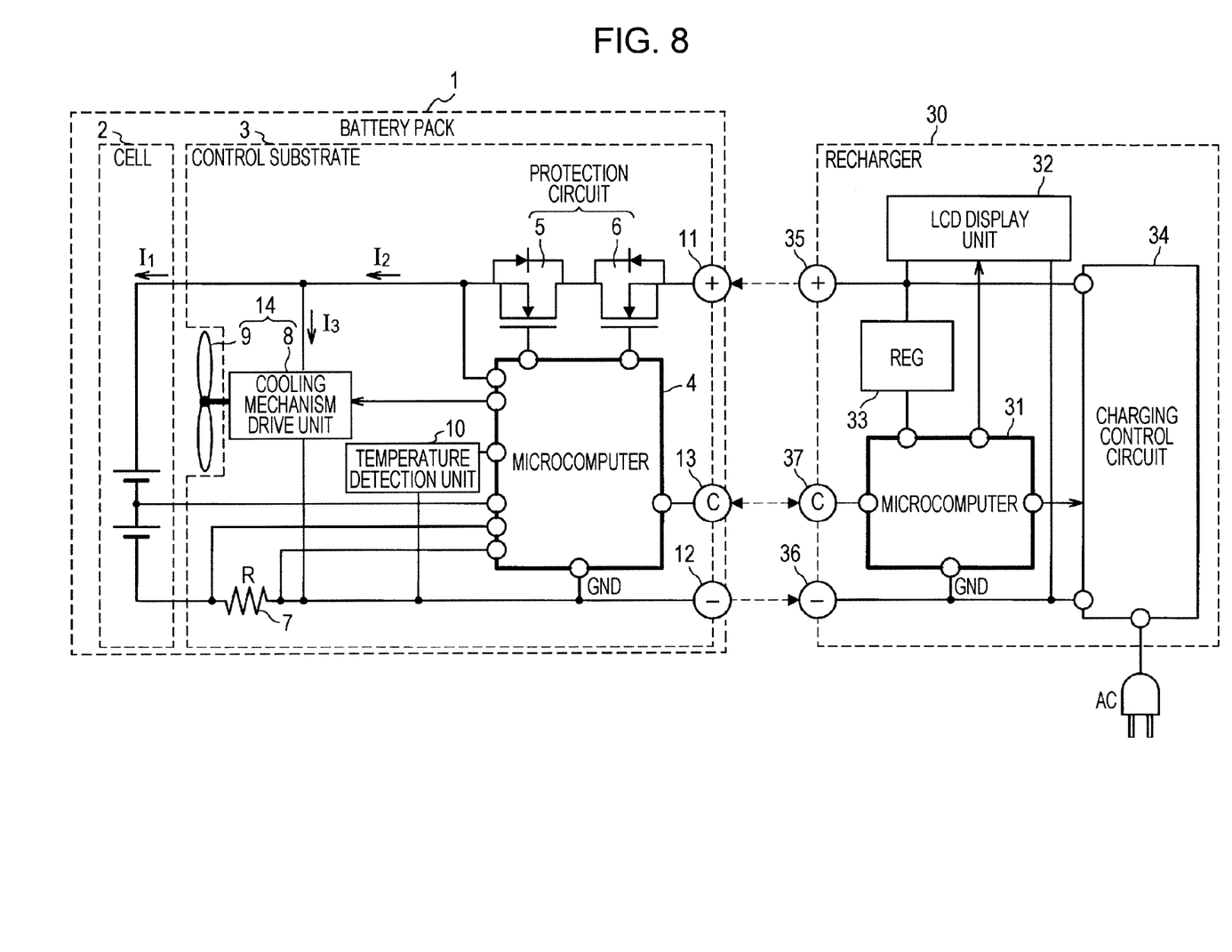
FIG. 8 is a block diagram showing a charging system according to another embodiment of the present invention.

The configuration of the recharger 30 according to another embodiment of the present invention is next described. FIG. 8 is a block diagram showing the battery pack 1 and the recharger 30.

The recharger 30 includes a microcomputer 31, a display device (referred to below as an LCD display unit) 32, and a power source block (referred to below as an REG) 33. Here, a device such as a power source circuit for charging which is the main function is a charging control circuit 34.

The microcomputer 31 includes at least a nonvolatile memory (referred to below as a memory) which stores each setting and data, a communication interface, a CPU which performs a charging time calculation or a remaining level calculation based on each information, and a display control circuit which generates a display signal.

The LCD display unit 32 is supplied with a display signal corresponding to a calculation result of the microcomputer 31 and displays charging time and the like based on the display signal. The REG 33 outputs a necessary voltage to each block.

The plus terminal 11 of the battery pack 1 described above is connected with a plus terminal 35 of the recharger 30, and the minus terminal 12 of the battery pack 1 is connected with a minus terminal 36 of the recharger 30. Charging current is supplied from the recharger 30 to the battery pack 1 via the plus terminal 35 and the minus terminal 36 of the recharger 30. Information communication between the microcomputer 4 of the battery pack 1 and the microcomputer 31 of the recharger 30 is performed via the control terminal (C) 13 of the battery pack 1 and a control terminal (C) 37 of the recharger 30.

In the microcomputer 31, information such as a safety standard charge upper-limit regulation temperature value of the battery and the like are preliminarily stored. The microcomputer 31 transmits battery necessary information such as information that the recharger 30 is [compatible]/[incompatible] with the cooling unit 14 to the battery pack 1.

[Operation of Charging System]

An operation of the charging system composed of the recharger 30 and the battery pack 1 is next described. Unlike the equipment system of the embodiment described first, power consumption (discharge) due to a use of the equipment does not occur in the charging system, so that charging and cooling are started at the same time.

Figure 9:
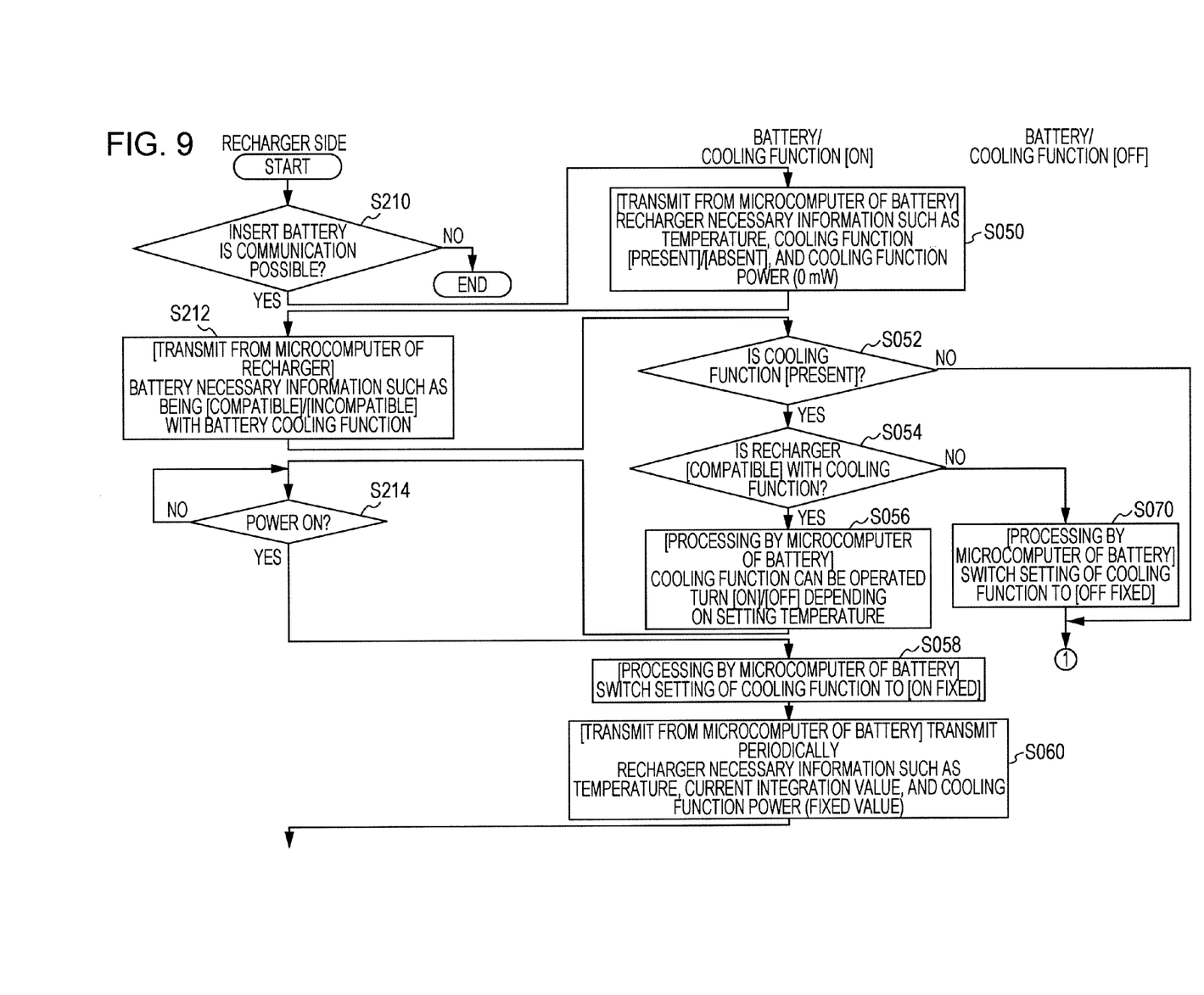
FIG. 9 is a flowchart showing an operation of the charging system according to the other embodiment of the present invention.

First, when the battery pack 1 is inserted into the recharger 30, whether the recharger 30 can communicate with the battery pack 1 is checked (step S210). When it is difficult for the recharger 30 and the battery pack 1 to mutually communicate, the embodiment of the present invention is not applied. On the other hand, in a case where the recharger 30 can communicate with the battery pack 1, when the battery pack 1 is installed in the recharger 30, recharger necessary information is transmitted from the microcomputer 4 of the battery pack 1 to the microcomputer 31 of the recharger 30 (step S050). The recharger necessary information is necessary for the recharger 30 and includes charging/discharging cycle information, a cell voltage value, a charge current value, information of a temperature of the inside of the battery pack 1, a full charge capacitance value, a current integration value, a power value of equipment, such as the video camera 20, which is used immediately before, [present]/[absent] information of the cooling unit 14, information of a power consumption value of the cooling unit 14, and the like.

During a period in which the cooling unit 14 is not operated, 0 mW is outputted as the power consumption value of the cooling unit 14 so as to be used as operation state determination information of the cooling unit 14 (step S050).

The recharger 30 transmits battery necessary information such as [compatible]/[incompatible] information with respect to the cooling unit 14 (step S212).

In a case where the cooling unit 14 is [present] in the battery pack 1 (step S052) and the recharger 30 is [compatible] with the cooling unit 14 (step S054), a command of [ON fixed] of the cooling unit 14 is transmitted from the microcomputer 31 of the recharger 30 after the recharger 30 is powered ON and the charging is started (step S056). Accordingly, the microcomputer 4 of the battery pack 1 switches the setting of the cooling unit 14 to [ON fixed] (step S058). As a result, the cooling unit 14 is operated from the charging start time so as to suppress a temperature rise of the battery pack 1.

The fixed setting of the cooling unit 14 is cancelled when the battery pack 1 is uninstalled from the recharger 30 or when the information communication is ceased. During a low temperature time in which charging current should be lowered, a command of [ON fixed] of the cooling unit 14 is not transmitted so as to avoid the execution of the cooling.

The recharger 30 switches to a quick charge mode in which charging is performed with large current which is higher than normal charging, enabling shortening of charging time (step S218).

Figure 10:
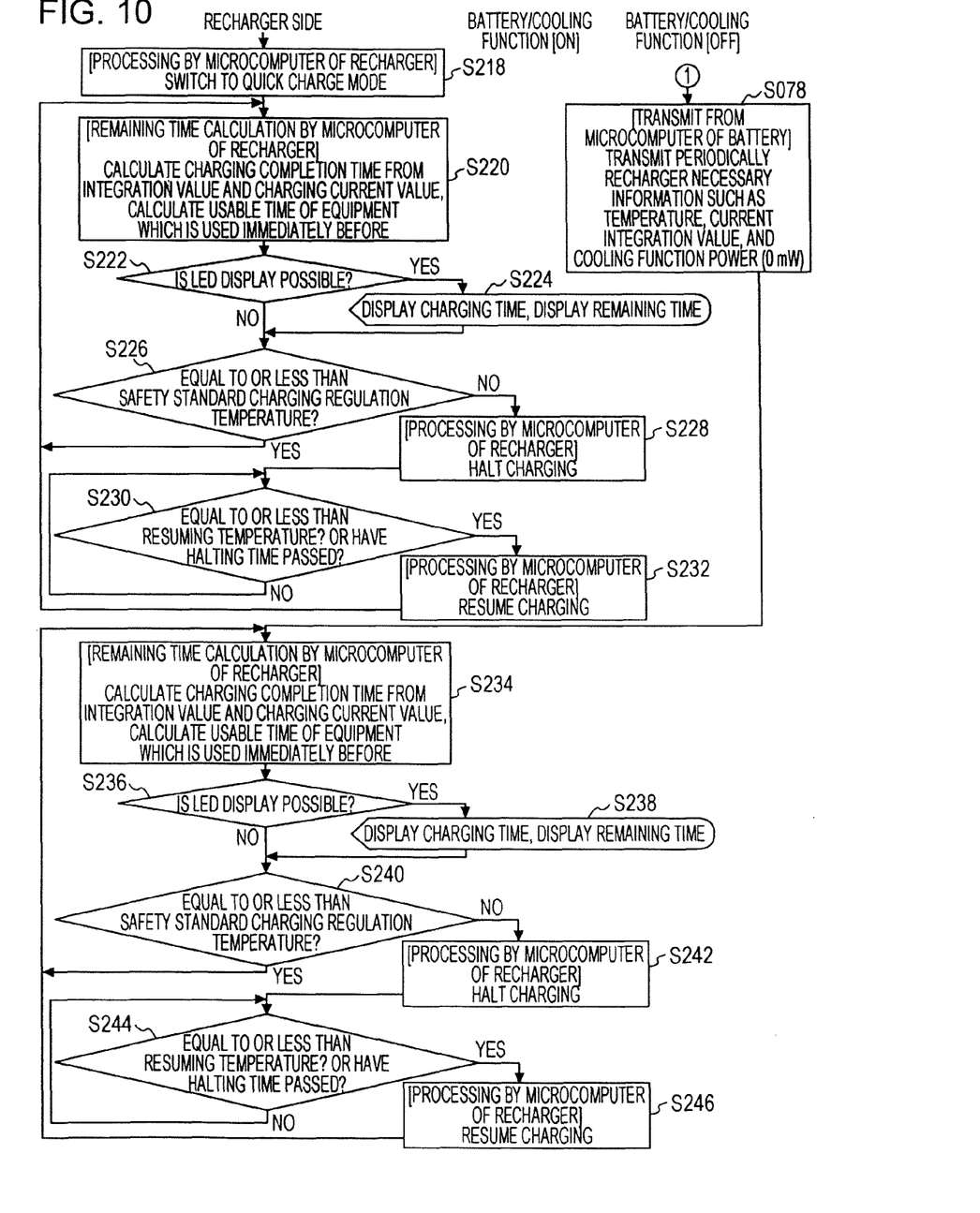
FIG. 10 is a flowchart showing the operation of the charging system according to the other embodiment of the present invention.

Calculations for obtaining battery remaining time and the like of a case where the battery pack 1 is used in equipment which is used immediately before are performed based on information which is periodically transmitted from the microcomputer 4 of the battery pack 1 to the microcomputer 31 of the recharger 30. Further, charging completion time is calculated based on the full charge capacitance, the current integration value, and the charging current value. The charging current value of the battery information does not include a consumption amount of the cooling unit 14. Therefore, the calculating formula is common not depending on [ON]/[OFF] of the cooling unit 14 (steps S220 and S234).

When the LCD display unit 22 of the video camera 20 is capable of displaying (steps S222 and S236), charging time and remaining time are displayed on the LCD display unit 32 (steps S224 and S238).

Irrespective of conditions of whether the cooling unit 14 is [present]/[absent] and whether the recharger 30 is [compatible]/[incompatible] with the cooling unit 14, whether the temperature of the inside of the battery pack 1 is equal to or less than the battery safety standard charge upper-limit regulation temperature which is stored in the microcomputer 31 of the recharger 30 (steps S226 and S240).

When the temperature of the inside of the battery pack 1 rises and reaches the battery safety standard charge upper-limit regulation temperature, the charging is shifted to a halt state (steps S228 and S242).

When the temperature of the inside of the battery pack 1 becomes equal to or less than the charge halt canceling temperature which has a hysteresis and is stored in the microcomputer 31 of the recharger 30, or after the halt time which is fixedly set passes, the charging is resumed (steps S232 and S246).

3. Advantageous Effect of Embodiments of Present Invention

In the equipment system according to the embodiment described first, the cooling unit 14 is operated even by the battery pack 1 itself at a high temperature, being able to largely raise an acceptable charging/discharging current value which is constrained in a temperature rise of a safety standard trial. Accordingly, used electronic equipment is not constrained by current of the safety standard.

Further, information such as whether the battery-powered equipment (video camera 20) is [compatible]/[incompatible] with the cooling unit 14 and [present]/[absent] information of the cooling unit 14 of the battery pack 1 are shared via communication so as to perform a fixed setting and the like of the cooling unit 14. Accordingly, the system can be used in any combination. This enables a wide range of lineup of the battery-powered equipment and the battery pack. For example, in a case of an inexpensive battery pack or a battery pack which the capacitance thereof is small and therefore the temperature is sufficiently low even when discharging is performed until the life of the battery is expired, the system can be operated without the cooling unit 14.

Further, the remaining battery level calculating formula includes the power consumption of the cooling unit 14, so that a remaining battery level can be accurately calculated in all cases where the equipment is [compatible]/[incompatible] with the cooling unit 14 and where the cooling unit 14 is [present]/[absent].

Furthermore, the operation of the cooling unit 14 in discharging due to a use of the equipment is limited exclusively to a case where the temperature rises close to the upper limit, being able to suppress unnecessary power consumption of the battery.

During the operation of the cooling unit 14, the attention attraction for notifying the operation state of the cooling unit 14 is displayed on the display unit of the equipment (video camera 20). Accordingly, a user can select whether the user continuously uses the equipment even though excess power is consumed or whether the user temporarily stops the use of the equipment so as to lower the temperature of the battery pack 1.

In the charging system according to the embodiment described second, the cooling unit 14 is operated from the beginning time and switched to a quick charging mode at which current is larger than the normal charging, based on the [present] information of the cooling unit 14 from the battery pack 1. Accordingly, the charging time can be shortened.

The present application contains subject matter related to that disclosed in Japanese Priority Patent Application JP 2010-049408 filed in the Japan Patent Office on Mar. 5, 2010, the entire contents of which are hereby incorporated by reference.

The preferred embodiments of the present invention are described above with reference to the accompanying drawings, but the embodiment of the present invention is not limited to the above examples. It is apparent for those skilled in the art that various modifications and alterations may occur within the scope of the technical idea according to embodiments of the present invention and it should be understood that these modifications and alterations be within the technical scope of the present invention.

What is claimed is:

1. A battery pack, comprising:
   a battery cell;
   a temperature detection unit configured to detect a temperature of the battery cell;
   a cooling unit configured to cool down the battery cell;
   an information reception unit configured to receive first information of whether electronic equipment is compatible with the cooling unit from the electronic equipment that is supplied with power from the battery cell; and
   a cooling function control unit configured to switch the cooling unit ON and OFF depending on the temperature that is detected in a case where the electronic equipment is compatible with the cooling unit, and keep a drive of the cooling unit OFF in a case where the electronic equipment is incompatible with the cooling unit, based at least in part on the first information.

2. The battery pack according to claim 1, further comprising:
   an information transmission unit configured to transmit a power consumption value of the cooling unit to the electronic equipment so that the electronic equipment calculates a usable time of the battery cell.

3. The battery pack according to claim 2, wherein the information transmission unit sets the power consumption value of the cooling unit to be 0 and transmits the power consumption value to the electronic equipment when the drive of the cooling unit is OFF.

4. The battery pack according to claim 2, wherein the information transmission unit transmits information showing that the drive of the cooling unit is OFF to the electronic equipment.

5. Electronic equipment comprising:
   a storage unit configured to hold first information of whether an equipment body is compatible with a cooling unit of a battery pack, the battery pack including a battery cell and the cooling unit configured to cool down the battery cell; and
   an information transmission unit configured to transmit the first information to the battery pack that switches the cooling unit ON and OFF depending on a detected temperature in a case where the equipment body is compatible with the cooling unit and keeps a drive of the cooling unit OFF in a case where the equipment body is incompatible with the cooling unit, based at least in part on the first information.

6. The electronic equipment according to claim 5, further comprising:
   an information reception unit configured to receive a power consumption value of the cooling unit from the battery pack; and
   a calculation unit configured to calculate a usable time of the battery cell based at least in part on the power consumption value of the cooling unit.

7. The electronic equipment according to claim 6, wherein the information reception unit receives a value of 0 as power consumption of the cooling unit from the battery pack when a drive of the cooling unit is OFF.

8. The electronic equipment according to claim 6, wherein the information reception unit receives information showing that the drive of the cooling unit is OFF from the battery pack.

9. An equipment system comprising:
   a battery pack, the battery pack including a battery cell, a temperature detection unit configured to detect a temperature of the battery cell, a cooling unit configured to cool down the battery cell, an information reception unit configured to receive first information of whether electronic equipment is compatible with the cooling unit from the electronic equipment that is supplied with power from the battery cell, and a cooling function control unit configured to switch the cooling unit ON and OFF depending on the temperature that is detected in a case where the electronic equipment is compatible with the cooling unit, and keep a drive of the cooling unit OFF in a case where the electronic equipment is incompatible with the cooling unit, based at least in part on the first information; and
   the electronic equipment including a storage unit configured to hold first information whether an equipment body is compatible with the cooling unit, and an information transmission unit configured to transmit the first information to the battery pack.

10. A method for controlling a battery pack cooling unit comprising the steps of:
    detecting a temperature of a battery cell of a battery pack;
    receiving from electronic equipment first information of whether the electronic equipment, being supplied with power from the battery cell, is compatible with a cooling unit, the cooling unit cooling down the battery cell,
    switching the cooling unit ON and OFF depending on the temperature that is detected in a case where the electronic equipment is compatible with the cooling unit, based at least in part on the first information; and
    keeping a drive of the cooling unit OFF in a case where the electronic equipment is incompatible with the cooling unit, based at least in part on the first information.

11. A program stored on a non-transitory computer-readable medium for allowing a computer to function as:
    a means for detecting a temperature of a battery cell of a battery pack;
    a means for receiving, from electronic equipment first information of whether the electronic equipment, being supplied with power from the battery cell, is compatible with a cooling unit, the cooling unit cooling down the battery cell;
    a means for switching the cooling unit ON and OFF depending on the temperature that is detected in a case where the electronic equipment is compatible with the cooling unit, based at least in part on the first information; and
    a means for keeping a drive of the cooling unit OFF in a case where the electronic equipment is incompatible with the cooling unit, based at least in part on the first information.

* * * * *